US010228062B2

(12) United States Patent
Howell et al.

(10) Patent No.: US 10,228,062 B2
(45) Date of Patent: Mar. 12, 2019

(54) MODULAR SEAL SECTION WITH EXTERNAL PORTS TO CONFIGURE CHAMBERS IN SERIES OR PARALLEL CONFIGURATION

(71) Applicant: GE Oil & Gas ESP, Inc., Oklahoma City, OK (US)

(72) Inventors: Alan Howell, Oklahoma City, OK (US); Charles Collins, Oklahoma City, OK (US); Aaron Noakes, Oklahoma City, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 272 days.

(21) Appl. No.: 15/261,977

(22) Filed: Sep. 11, 2016

(65) Prior Publication Data

US 2017/0074406 A1 Mar. 16, 2017

Related U.S. Application Data

(60) Provisional application No. 62/217,654, filed on Sep. 11, 2015.

(51) Int. Cl.
*E21B 43/12* (2006.01)
*F16J 15/46* (2006.01)

(52) U.S. Cl.
CPC .............. *F16J 15/46* (2013.01); *E21B 43/128* (2013.01)

(58) Field of Classification Search
CPC .................................................... E21B 43/128
See application file for complete search history.

(56) References Cited

U.S. PATENT DOCUMENTS

| 2002/0192090 | A1* | 12/2002 | Du | E21B 43/128 |
| | | | | 417/423.11 |
| 2007/0074872 | A1 | 4/2007 | Du et al. | |
| 2007/0224056 | A1 | 9/2007 | Watson et al. | |
| 2007/0277969 | A1 | 12/2007 | Hall et al. | |
| 2010/0202896 | A1* | 8/2010 | Du | F04D 13/10 |
| | | | | 417/53 |
| 2011/0014071 | A1 | 1/2011 | Du et al. | |
| 2013/0240199 | A1 | 9/2013 | Howell et al. | |
| 2015/0052989 | A1 | 2/2015 | Semple et al. | |
| 2015/0323079 | A1* | 11/2015 | Semple | F16J 15/40 |
| | | | | 277/348 |

FOREIGN PATENT DOCUMENTS

WO 2016044579 A1 3/2016

OTHER PUBLICATIONS

PCT Search Report and Written Opinion issued in connection with corresponding PCT Application No. PCT/US2016/051295 dated Nov. 16, 2016.

* cited by examiner

*Primary Examiner* — Shane Bomar
(74) *Attorney, Agent, or Firm* — Crowe & Dunlevy, P.C.

(57) ABSTRACT

A modular seal section for use within a downhole pumping system includes an upper fluid compensation section, a lower fluid compensation section and a guide body connected between the upper fluid compensation section and lower fluid compensation section. The guide body includes a configuration selection mechanism that can be externally manipulated to selectively place the upper fluid compensation section in either a series or parallel configuration with the lower fluid compensation section.

18 Claims, 7 Drawing Sheets

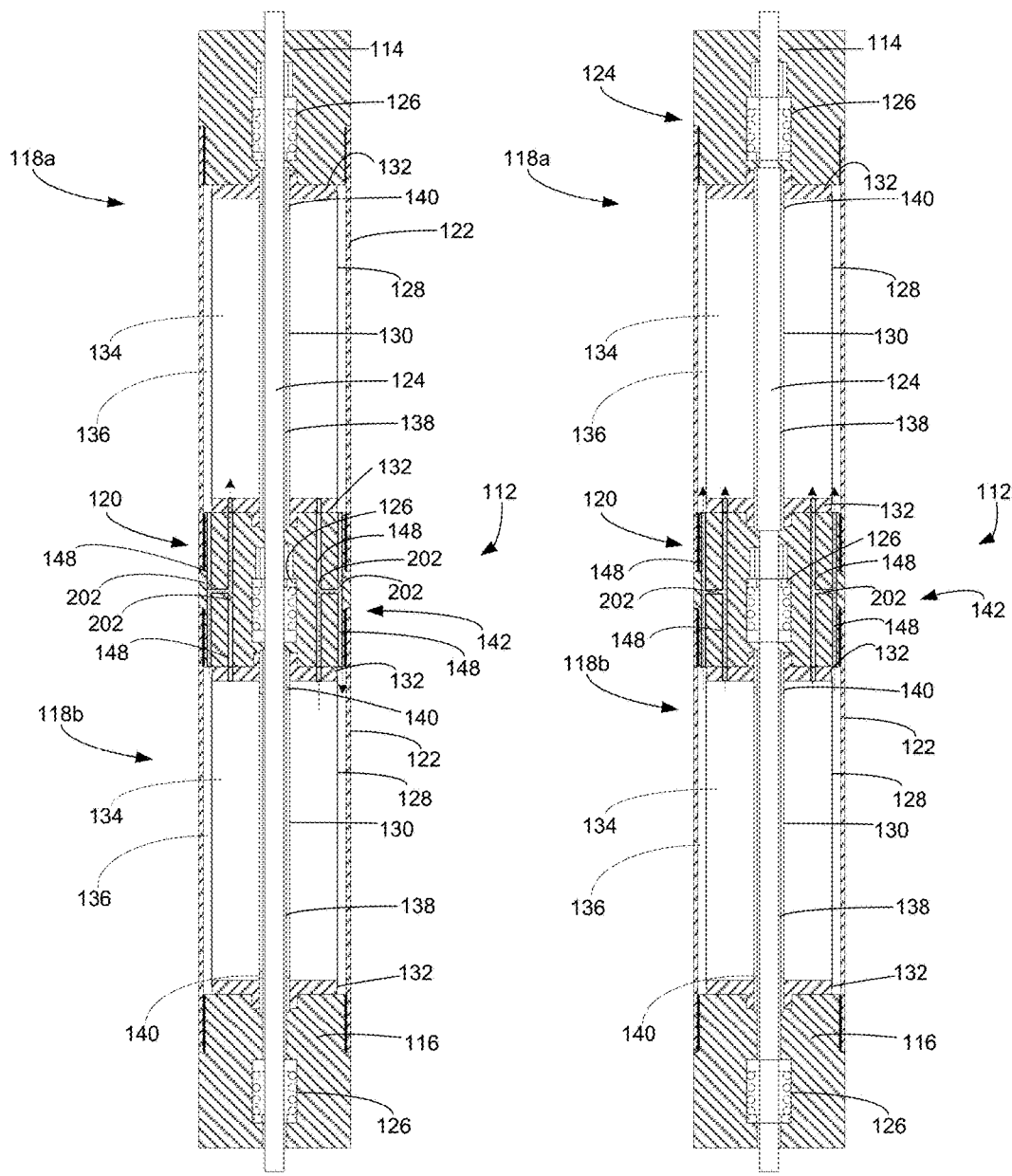

MODULAR SEAL SECTION WITH EXTERNAL PORTS TO CONFIGURE CHAMBERS IN SERIES OR PARALLEL CONFIGURATION

RELATED APPLICATIONS

This application claims the benefit of U.S. Provisional Patent Application Ser. No. 62/217,654 entitled "Modular Seal Section with External Ports to Configure Chambers in Series or Parallel Configuration," filed Sep. 11, 2015, the disclosure of which is herein incorporated by reference.

FIELD OF THE INVENTION

This invention relates generally to the field of submersible pumping systems, and more particularly, but not by way of limitation, to a modular seal section for use with a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, absorbing axial thrust imparted by the pump, and accommodating the expansion and contraction of the dielectric motor lubricant as the motor moves through thermal cycles during operation and pressure equalization. Many seal sections employ seal bags to accommodate the volumetric changes and movement of fluid in the seal section. Seal bags can also be configured to provide a positive barrier between clean lubricant and contaminated wellbore fluid.

Modern seal sections may include two or more seal bags connected in parallel or series configurations. When seal bags are placed in series, the oil from one bag is kept separate from the oil in another bag by the use of a shaft seal between each section. In this way, seal bags connected in a series configuration function as redundant seals. If the first seal bag is compromised or avoided, the foreign fluid is prevented from going into the motor by the second seal bag. In contrast, multiple seal bags connected in a parallel configuration do not provide a redundant layer of protection. Instead, seal bags connected in a parallel configuration are intended to simply increase the overall effective volume change capacity within the seal section.

Although the use of parallel and series seal bags has been widely adopted, there remains a need for an improved seal section that has a standardized construction and that can be more easily configured for either parallel or series configuration. It is to this and other needs that the present invention is directed.

SUMMARY OF THE INVENTION

In some embodiments, the present invention includes a guide body for use in a seal section within a downhole pumping system, where the seal section includes an upper fluid compensation section, a lower fluid compensation section and a shaft extending through the upper and lower fluid compensation sections and guide body. The guide body includes a configuration selection mechanism that can be externally manipulated to selectively place the upper fluid compensation section in either a series or parallel configuration with the lower fluid compensation section.

In another aspect, the invention includes a seal section for use in a downhole pumping system, where the seal section includes a lower section, an upper section and a guide body connected between the lower section and the upper section. The guide body includes a configuration selection mechanism that can be externally manipulated to selectively place the upper section in either a series or parallel configuration with the lower section.

In yet another aspect, the present invention includes a seal section for use in a downhole pumping system, the where the seal section includes a lower section, an upper section and a guide body connected between the lower section and the upper section. The guide body has a configuration selection mechanism that can be externally manipulated to selectively place the upper section in either a series or parallel configuration with the lower section. The configuration selection mechanism includes a plurality of passages extending from the upper section to the lower section. The configuration mechanism also includes one or more plugs removably installed within a corresponding one of the plurality of passages. Each of the one or more plugs is selected from the group consisting of blocking plugs, end plugs, series flow plugs and parallel flow plugs.

BRIEF DESCRIPTION OF THE DRAWINGS

FIG. 3 is a cross-sectional view of a portion of the seal section of FIG. 2 in a series configuration.
FIG. 4 is a cross-sectional view of a portion of the seal section of FIG. 2 in a parallel configuration.

WRITTEN DESCRIPTION

Figure 1:
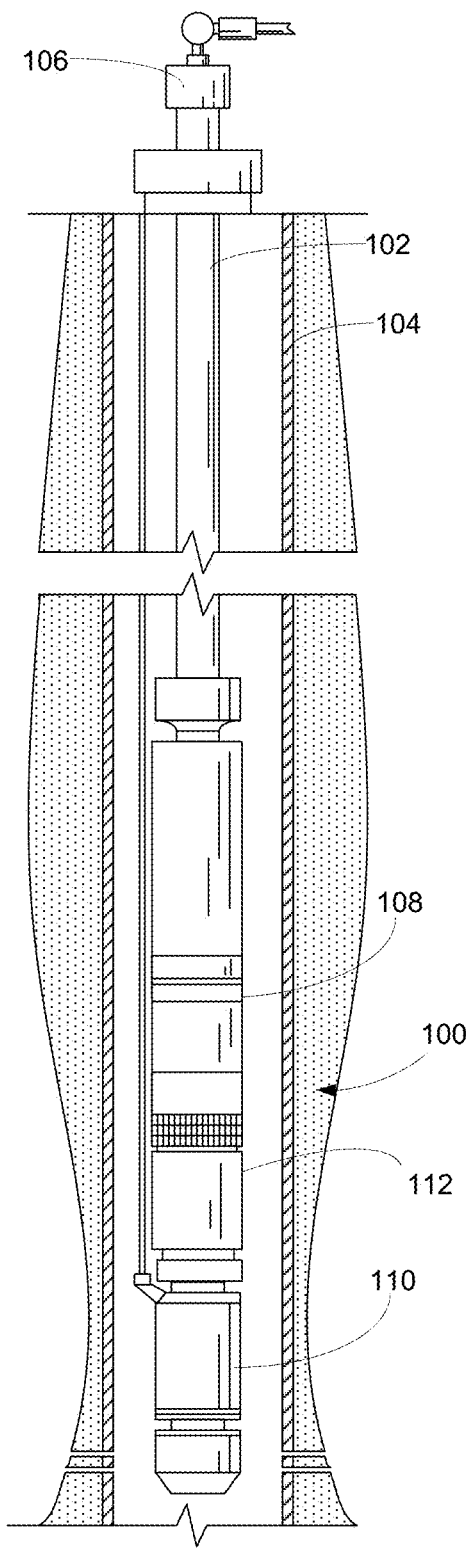
FIG. 1 is a front perspective view of a downhole pumping system.

In accordance with an exemplary embodiment of the present invention, FIG. 1 shows a front perspective view of a downhole pumping system 100 attached to production tubing 102. The downhole pumping system 100 and production tubing 102 are disposed in a wellbore 104, which is drilled for the production of a fluid such as water or petroleum. Although the downhole pumping system 100 is depicted in a vertical well, it will be appreciated that the downhole pumping system 100 can also be used in horizontal, deviated and other non-vertical wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes some combination of a pump assembly 108, a motor assembly 110 and a seal section 112. The motor assembly 110 is an electrical motor that receives its power from a surface-based supply. The motor assembly 110 converts electrical energy into mechanical energy, which is transmitted to the pump assembly 108 by one or more shafts. The pump assembly 108 then transfers a portion of this mechanical energy to fluids within the wellbore, causing the wellbore fluids to move through the production tubing to the surface.

The seal section 112 shields the motor assembly 110 from mechanical thrust produced by the pump assembly 108. The seal section 112 is also configured to mitigate the introduction of contaminants from the wellbore 104 into the motor assembly 110. Although only one pump assembly 108, seal section 112 and motor assembly 110 are shown, it will be understood that the downhole pumping system 100 could include additional pumps assemblies 108, seals sections 112 or motor assemblies 110.

Figure 2:
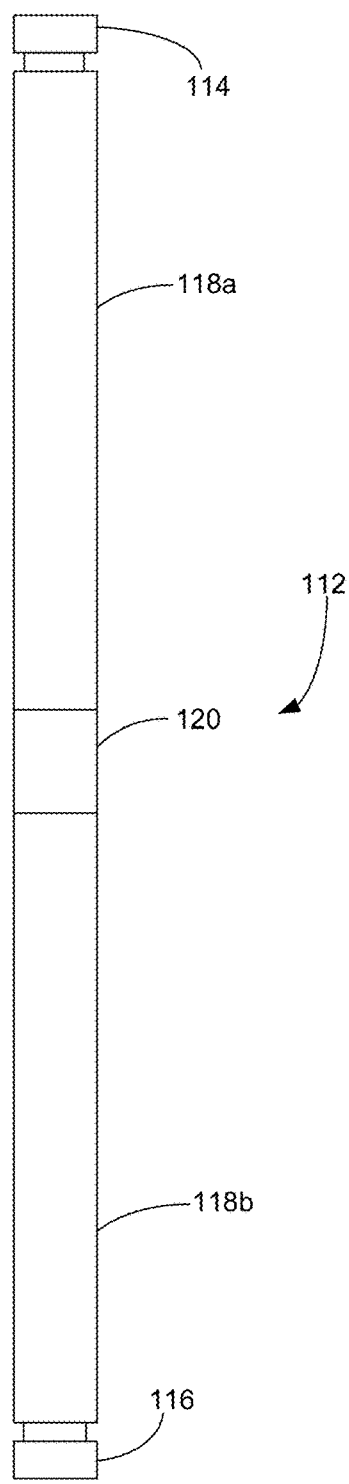
FIG. 2 is an elevational view of a modular seal section.

Referring now to FIG. 2, shown therein is an elevational view of the seal section 112. The seal section 112 includes a head 114, a base 116, an upper fluid compensation section 118a, a lower fluid compensation section 118b, and a guide body 120. The head 114 is configured for connection to the pump assembly 108 and the base 116 is configured for connection to the motor assembly 110. The upper fluid compensation section 118a and lower fluid compensation section 118b are each connected to the guide body 120. It will be understood that the seal section 112 may include additional fluid compensation sections 118 and guide bodies 120 that include different components or components arranged in different configurations.

Turning to FIGS. 3 and 4, shown therein are cross-sectional views of the seal section 112 configured in series and parallel configurations, respectively. The seal section 112 includes a common housing 122 and a common shaft 124. The shaft 124 transfers mechanical energy from the motor assembly 110 to the pump assembly 108. Each bag upper and lower fluid compensation section 118a, 118b is connected to the guide body 120. It will be understood that the housing 122 may be segmented, with separate sections joined by a threaded connection to the guide body 120. Shaft seals 126 may be located along the shaft 124 throughout the seal section 112.

Each upper and lower fluid compensation section 118a, 118b includes a mechanism for isolating lubricant fluids from wellbore fluids, for compensating for the expansion and contraction of fluids or a combination of these functions. These fluid isolation and expansion mechanisms include pistons, metal bellows, seal bags and labyrinth chambers. As depicted in FIGS. 3 and 4, each upper and lower fluid compensation sections 118a, 118b includes a seal bag 128, bag support tube 130 and a seal bag retention mechanism 132. The seal bag 128 is configured to mitigate the contamination of clean motor lubricants with wellbore fluids. In some embodiments, the seal bag 128 is fabricated from a suitable plastic, polymer or elastomer, which are commercially available from a number of sources, including E.I. du Pont de Nemours and Company and Daikin Industries.

Suitable plastics include PTFE, AFLAS® and other fluoropolymer plastics that exhibit favorable resistance to corrosive chemicals and elevated temperatures. The seal bag retention mechanism 132 may include a conventional flange and locking clamp arrangement.

Each seal bag 128 defines an interior bag space 134 and an exterior bag space 136. The bag support tube 130 includes an annular space 138 surrounding the shaft 124 and ports 140 that place the annular space 138 in fluid communication with the interior bag space 134. The bag support tube 130 provides support for the seal bag 128 and shields the shaft 124 as its passes through the seal bag 128.

The guide body 120 includes a configuration selection mechanism 142. The configuration selection mechanism 142 permits the selective configuration of the bag sections 118a, 118b in parallel or series configuration. The configuration selection mechanism 142 generally includes a series of passages 148 and plugs 200 that control the flow of fluid through guide body 120. The plugs 200 can be externally manipulated through the housing 122 to block or permit flow through the internal passages 148. This allows the seal section 112 to be easily converted from one configuration to another configuration without disassembling the seal section 112 by adding, removing or changing the plugs 200 within the guide body 120.

An exemplary embodiment of the configuration selection mechanism 142 is depicted in FIGS. 3 and 4. In the embodiment depicted in FIG. 3, the configuration selection mechanism 142 is set to place the bag section 118b in a series configuration with bag section 118a. The interior bag space 134 of the lower bag section 118b is routed by the configuration selection mechanism 142 into the exterior bag space 136 of the lower bag section 118b. The exterior bag space 136 of the lower bag section 118b is then placed in fluid communication through the configuration selection mechanism 142 into the interior bag space 134 of the upper bag section 118a. In this embodiment, the plugs 200 are blocking plugs 202 that prevent the flow of fluid through passages 148 in which the blocking plugs 202 are installed.

In contrast, in the embodiment depicted in FIG. 4, the bag selection mechanism 142 is set to place the lower bag section 118b into parallel arrangement with upper bag section 118a. In this configuration, the interior bag space 134 of the lower bag section 118b is routed through the configuration selection mechanism 142 into the interior bag space 134 of the upper bag section 118a. The exterior bag space 136 of the lower bag section 118b is placed in fluid communication with the exterior bag space 136 of the upper bag section 118a.

Figure 5:
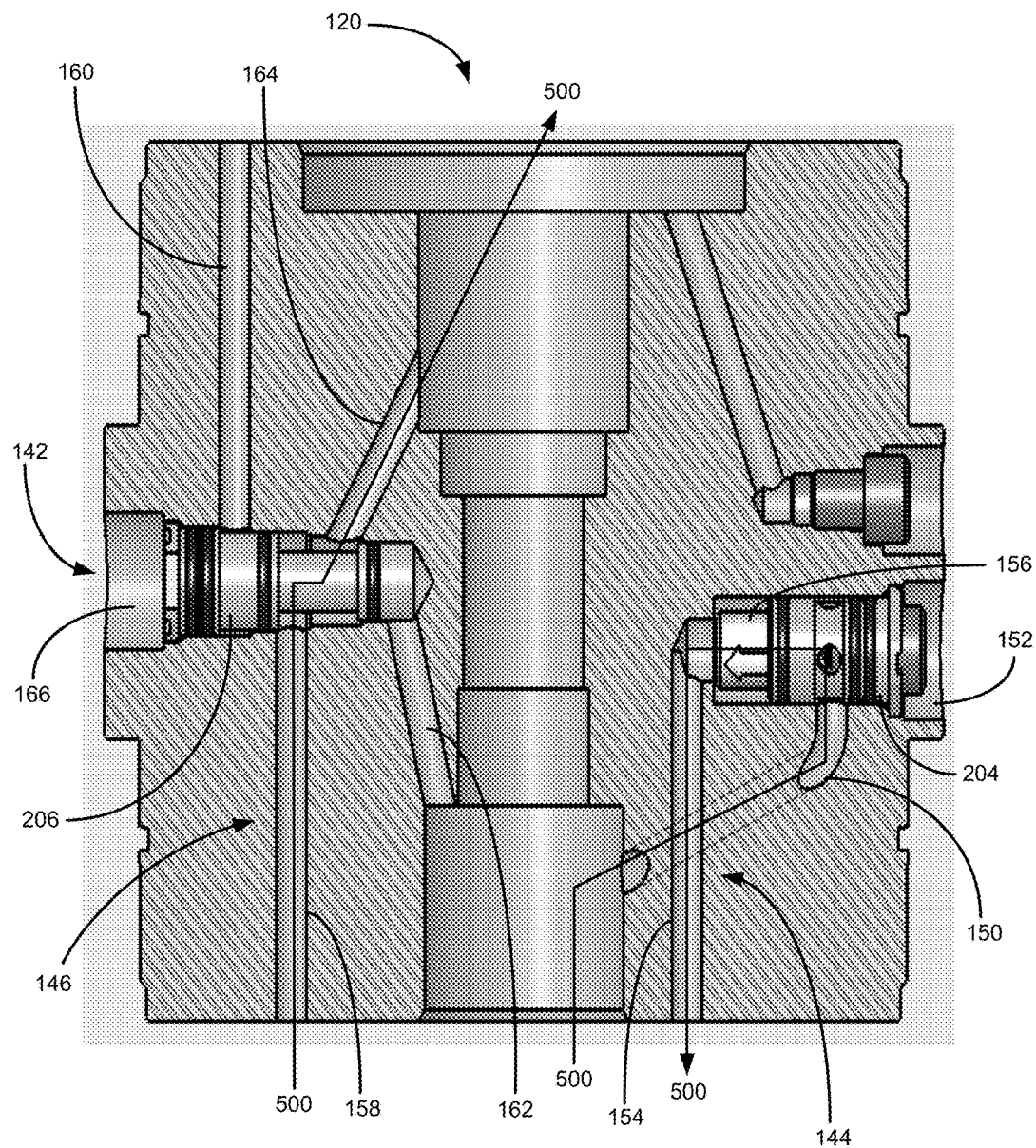
FIG. 5 is a cross-sectional view of the guide assembly of a seal section placed in a series configuration.
Figure 6:
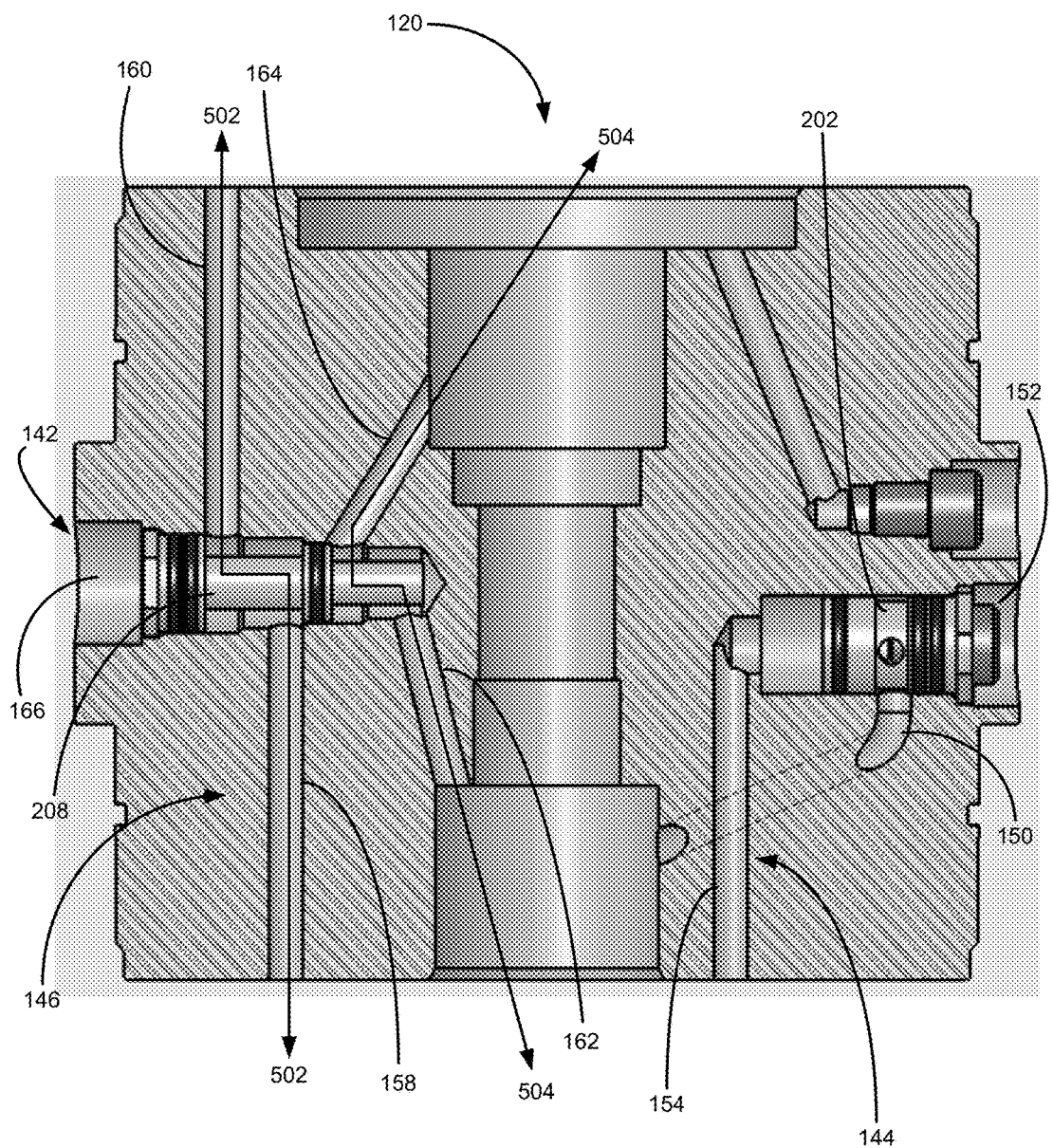
FIG. 6 is a cross-sectional view of the guide assembly of a seal section placed in a parallel configuration.

Turning to FIGS. 5 and 6, shown therein are cross-sectional views of the guide body 120 constructed in accordance with another exemplary embodiment. In FIG. 5, the configuration selection mechanism 142 is configured to place the upper and lower bag sections 118a, 118b in a series configuration. The configuration selection mechanism 142 includes a first set of selector passages 144, a second set of selector passages 146 and one or more removable plugs 200. The first set of selector passages 144 includes an interior branch 150, a first plug channel 152 and an exterior branch 154. The interior branch 150 places the first plug channel 152 in fluid communication with the interior bag space 134 of the lower bag section 118b. The exterior branch 154 places the first plug channel 152 in fluid communication with the exterior bag space 136 of the lower bag section 118b.

An end plug 204 is installed within the first plug channel 152. The end plug 204 does not include a flow passage, but directs flow from the interior branch 150 through an interior portion of the first plug channel 152 and into the exterior branch 154. Before the end plug 204 is installed, a check valve 156 is placed within the first plug channel 152 from the exterior of the guide body 120. The end plug 204 and check valve 156 permit the one-way passage of fluid from the interior bag space 134 of the lower bag section 118b through the guide body 120 and into the exterior bag space 136 of the lower bag section 118b. The check valve 156 prevents fluid from passing from the exterior bag space 136 of the lower bag section 118b into the interior bag space 134 of the lower bag section 118b.

The second set of selector passages 146 includes a lower exterior port 158, an upper exterior port 160, a lower interior port 162, an upper interior port 164 and a second plug channel 166. The lower exterior port 158 connects the second plug channel 166 with the exterior bag space 136 of the lower bag section 118b. The upper exterior port 160 connects the second plug channel 166 with the exterior bag space 136 of the upper bag section 118a. The lower interior port 162 connects the second plug channel 166 with the interior bag space 134 of the lower bag section 118b. The upper interior port 164 connects the second plug channel 166 with the interior bag space 134 of the upper bag section 118a. The second plug channel 166 is accessible from the exterior of the guide body 120 and is configured to receive a variety of plugs to control and modify the flow of fluid through the second plug channel 166. As shown in FIG. 5, the second set of selector passages 146 includes a series flow plug 206 that that permits flow around the series flow plug 206 between the lower exterior port 158 and the upper interior port 164.

In this way, the guide body 120 as configured in FIG. 5 creates a series configuration between the lower bag section 118b and the upper bag section 118a. As illustrated by arrows 500, fluid from the interior bag space 134 of the lower bag section 118b passes into the first selector passages 144 through the first plug channel 152, through the check valve 156 and into the exterior bag space 136 of the lower bag section 118b. Next, the fluid is allowed to pass through the lower exterior port 158 of the second set of selector passages 146 and into the interior bag space 134 of the upper bag section 118a through the upper interior port 164.

The series configuration depicted in FIG. 5 can be rapidly and easily changed to a parallel configuration by changing the plugs 200 used in the first and second sets of selector passages 144, 146. For example, in the configuration depicted in FIG. 6, a larger blocking plug 202 has been installed in the first plug channel 152 to prevent the flow of fluid through the first selector passages 144. A parallel flow plug 208 has been installed in the second plug channel 166 that permits flow between the lower exterior port 158 and the upper exterior port 160 (as illustrated by arrows 502). The parallel flow plug 208 includes an internal flow passage and is sized to also permit the flow of fluid through the end of the second plug channel 166 between the lower interior port 162 and upper interior port 164 (as illustrated by arrows 504). Thus, by simply replacing the plugs 200 in the first and second selector passages 144, 146, the seal section 112 can be easily converted between series and parallel configurations in the field without disassembling the seal section 112.

Figure 7:
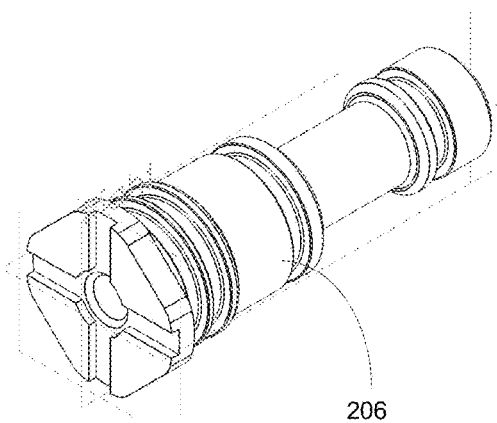
FIG. 7 is a perspective view of a series flow plug.
Figure 8:
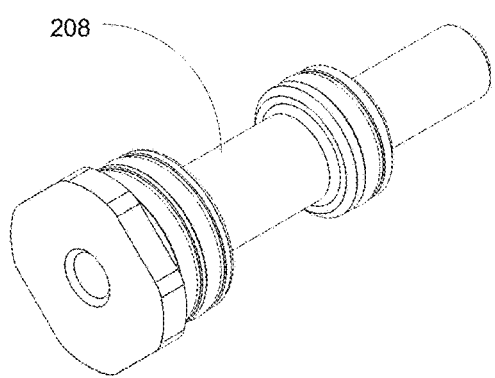
FIG. 8 depicts a parallel flow plug.
Figure 9:
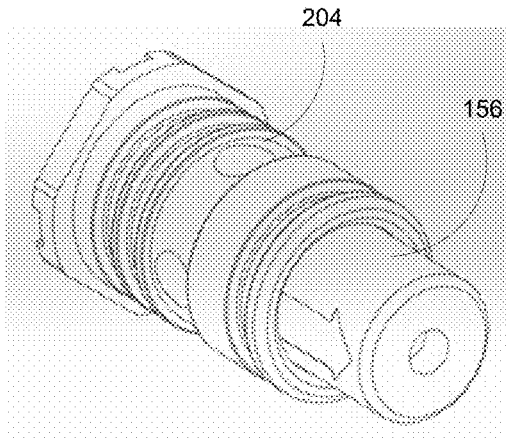
FIG. 9 depicts a check valve.
Figure 10:
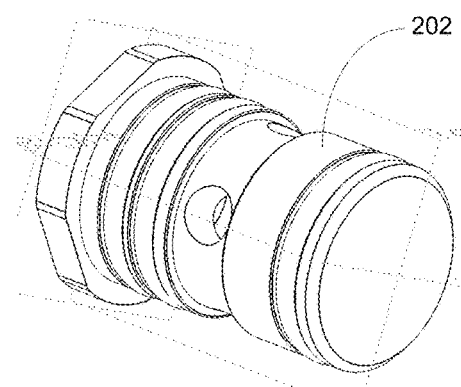
FIG. 10 depicts a blocking plug.

Turning to FIGS. 7-10, shown therein are perspective views of a variety of plugs 200. In exemplary embodiments, the plugs 200 are sized, color coded or otherwise marked or configured to facilitate installation and recognition of series and parallel configurations. Standardizing and simplifying the configuration of the plugs 200 reduces the risk that the seal section 112 is inadvertently placed in an improper configuration. FIG. 7 depicts a series flow plug 206. FIG. 8 depicts an exemplary parallel flow plug 208. FIG. 9 depicts the end plug 204 and the check valve 156. FIG. 10 depicts the blocking plug 202. It will be appreciated that these plugs 200 are merely examples of the types of plugs 200 that can be used within the configuration selection mechanism 142 and that the invention is not limited to those plugs 200 depicted in FIGS. 7-10.

Figure 11:
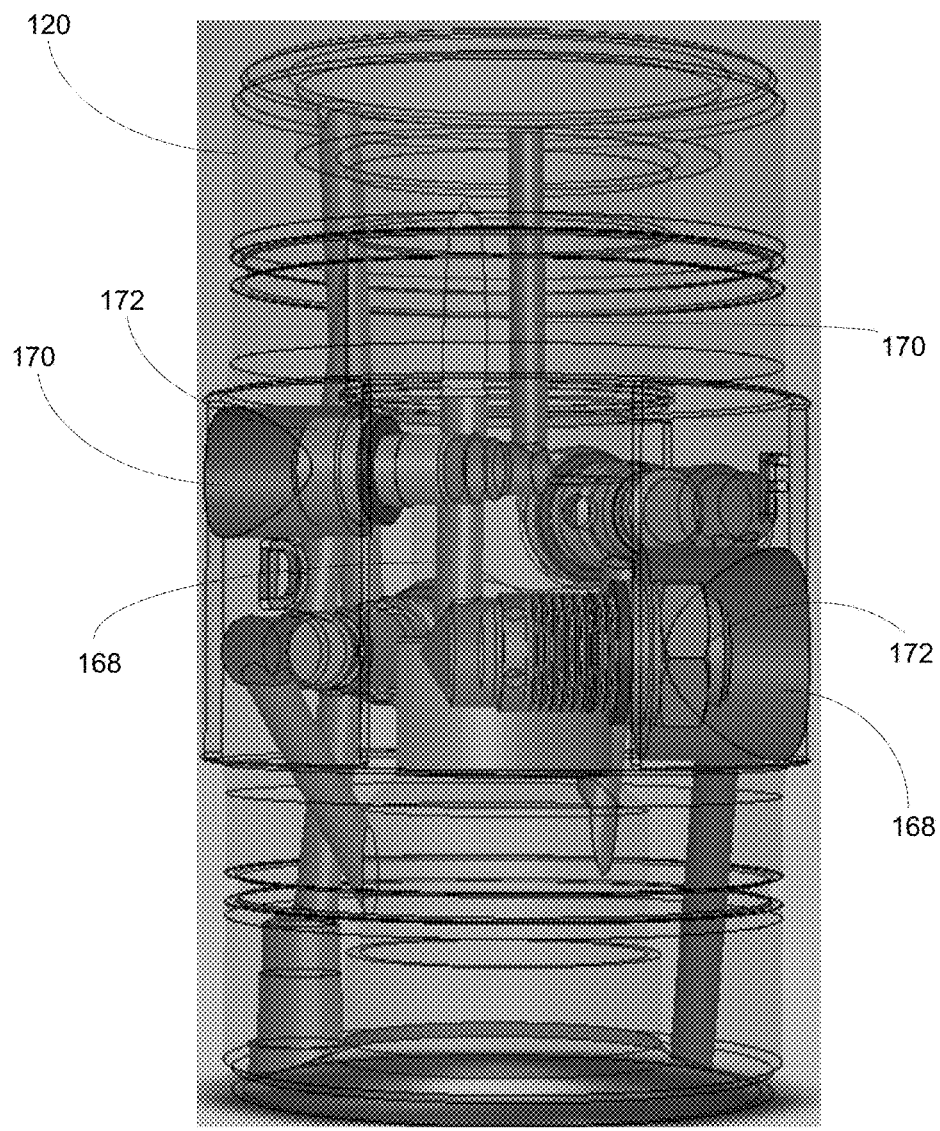
FIG. 11 is partially transparent view of the guide assembly of a seal section illustrating the drain and fill ports.

Turning to FIG. 11, the guide body 120 optionally includes an annular space access port 168 that provides direct access to the annular space 138 between the shaft 124 and the bag support tube 130. The annular space access port 168 can be used to easily drain and fill fluid in the annular space 138. The guide body 120 also includes a seal bag drain 170 that communicates directly with the interior bag space 134 of the upper bag section 118. The seal bag drain 170 permits the operator to take fluid samples directly from the interior bag space 134 of the upper seal bag 128 in the field before the seal section is disassembled or transported to a service location. The annular space access port 168 and seal bag drain 170 can both be blocked with a suitable drain plug 172.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A guide body for use in a seal section within a downhole pumping system, wherein the seal section includes an upper fluid compensation section, a lower fluid compensation section and a shaft extending through the upper and lower fluid compensation sections and guide body, wherein the guide body comprises a configuration selection mechanism that can be externally manipulated to selectively place the upper fluid compensation section in either a series or parallel configuration with the lower fluid compensation section, wherein the configuration selection mechanism comprises:
   a plurality of passages extending from the upper fluid compensation section to the lower fluid compensation section; and
   one or more plugs, wherein each of the one or more plugs is installed within a corresponding one of the plurality of passages.

2. A guide body for use in a seal section within a downhole pumping system, wherein the seal section includes an upper fluid compensation section, a lower fluid compensation section and a shaft extending through the upper and lower fluid compensation sections and guide body, wherein the guide body comprises a configuration selection mechanism that can be externally manipulated to selectively place the upper fluid compensation section in either a series or parallel configuration with the lower fluid compensation section, wherein the configuration selection mechanism comprises:
   a first set of selector passages;

a second set of selector passages; and
one or more externally accessible plugs, wherein the one or more plugs control the flow of fluid through the first and second selector passages.

3. The guide body of claim 2, wherein the first set of selector passages comprises:
an interior branch;
a first plug channel; and
an exterior branch.

4. The guide body of claim 3, wherein the second set of selector passages comprises:
a lower exterior port;
an upper exterior port;
a lower interior port;
an upper interior port; and
a second plug channel.

5. The guide body of claim 4, further comprising an annular space access port.

6. The guide body of claim 4, further comprising a seal bag drain.

7. The guide body of claim 1 where the upper and lower fluid compensation sections are each selected from the group consisting of bag chambers, labyrinth chambers, piston chambers, and metal bellows chambers.

8. A seal section for use in a downhole pumping system, the seal section comprising:
a lower section;
an upper section; and
a guide body connected between the lower section and the upper section, wherein the guide body comprises a configuration selection mechanism that can be externally manipulated to selectively place the upper section in either a series or parallel configuration with the lower section, wherein the configuration selection mechanism comprises:
a plurality of passages extending from the upper section to the lower section; and
one or more plugs, wherein each of the one or more plugs is installed within a corresponding one of the plurality of passages.

9. The seal section of claim 8, wherein the upper section comprises a fluid isolation and expansion mechanisms selected from the group consisting of pistons, metal bellows, seal bags and labyrinth chambers.

10. The seal section of claim 8, wherein the lower section comprises a fluid isolation and expansion mechanisms selected from the group consisting of pistons, metal bellows, seal bags and labyrinth chambers.

11. A seal section for use in a downhole pumping system, the seal section comprising:
a lower section;
an upper section; and
a guide body connected between the lower section and the upper section, wherein the guide body comprises a configuration selection mechanism that can be externally manipulated to selectively place the upper section in either a series or parallel configuration with the lower section, wherein the configuration selection mechanism comprises:
a first set of selector passages;
a second set of selector passages; and
one or more externally accessible plugs, wherein the one or more plugs control the flow of fluid through the first and second selector passages.

12. The seal section of claim 11, wherein the first set of selector passages comprises:
an interior branch;
a first plug channel; and
an exterior branch.

13. The seal section of claim 11, wherein the second set of selector passages comprises:
a lower exterior port;
an upper exterior port;
a lower interior port;
an upper interior port; and
a second plug channel.

14. The seal section of claim 11, further comprising an annular space access port.

15. A seal section for use in a downhole pumping system, the seal section comprising:
a lower section;
an upper section; and
a guide body connected between the lower section and the upper section, wherein the guide body comprises a configuration selection mechanism that can be externally manipulated to selectively place the upper section in either a series or parallel configuration with the lower section, wherein the configuration selection mechanism comprises:
a plurality of passages extending from the upper section to the lower section; and
one or more plugs removably installed within a corresponding one of the plurality of passages, wherein each of the one or more plugs is selected from the group consisting of blocking plugs, end plugs, series flow plugs and parallel flow plugs.

16. The seal section of claim 15, wherein each of the upper and lower sections comprise a fluid isolation and expansion mechanisms selected from the group consisting of pistons, metal bellows, seal bags and labyrinth chambers.

17. The seal section of claim 15, wherein the configuration selection mechanism comprises:
a first set of selector passages;
a second set of selector passages; and
one or more externally accessible plugs, wherein the one or more plugs control the flow of fluid through the first and second selector passages.

18. The seal section of claim 17, wherein the first set of selector passages comprises:
an interior branch;
a first plug channel; and
an exterior branch.

* * * * *